July 10, 1928.
H. H. SCHIELER
MOTOR VEHICLE
Filed Nov. 15, 1923
1,676,357
5 Sheets-Sheet 1
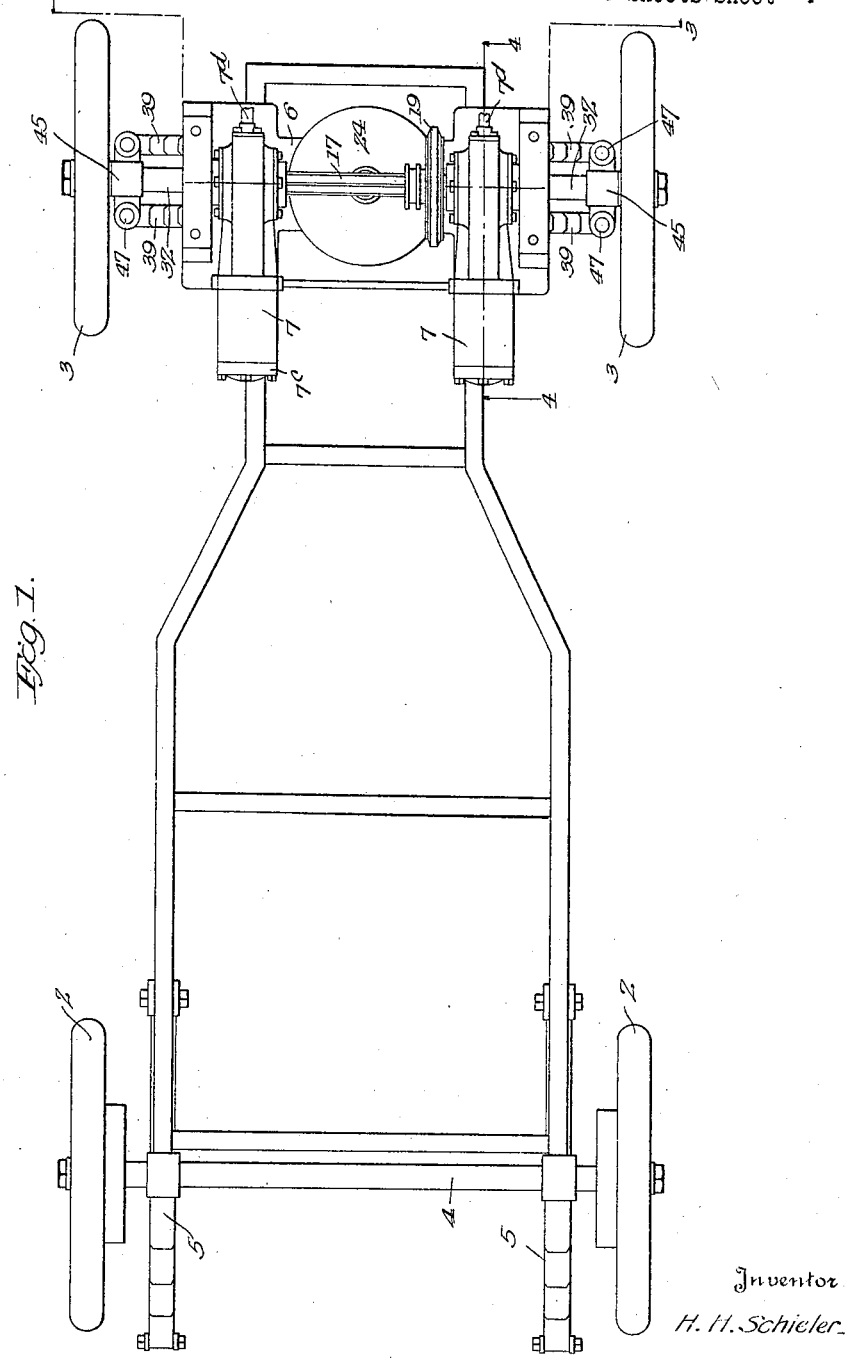

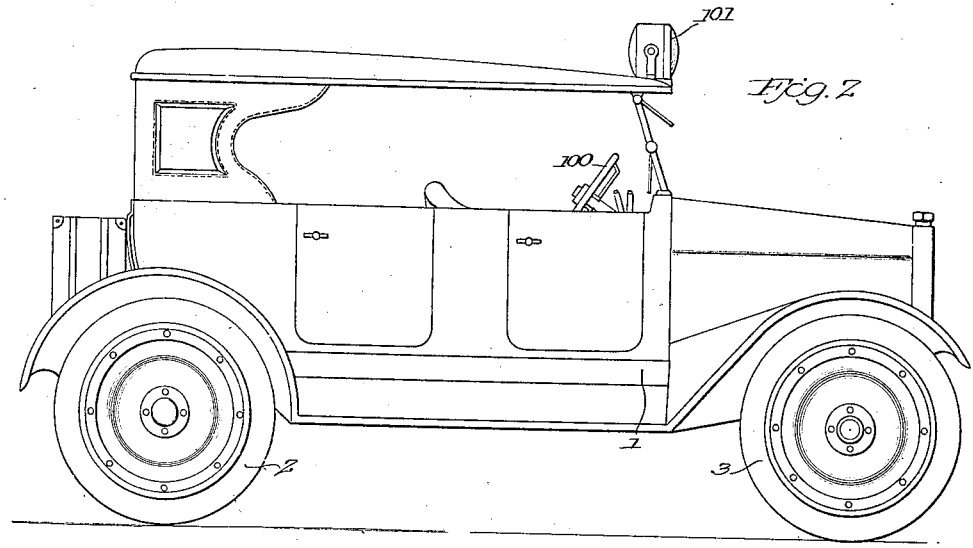
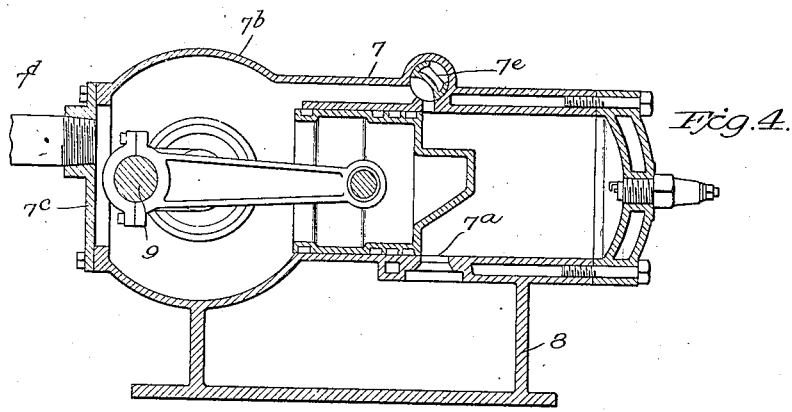
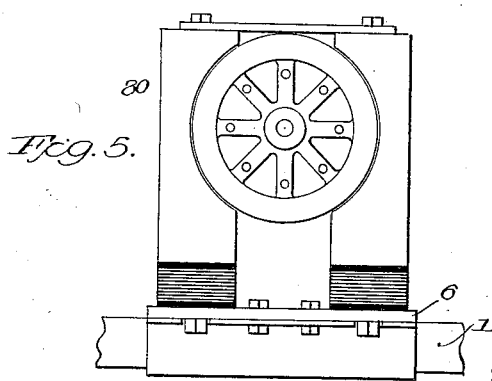

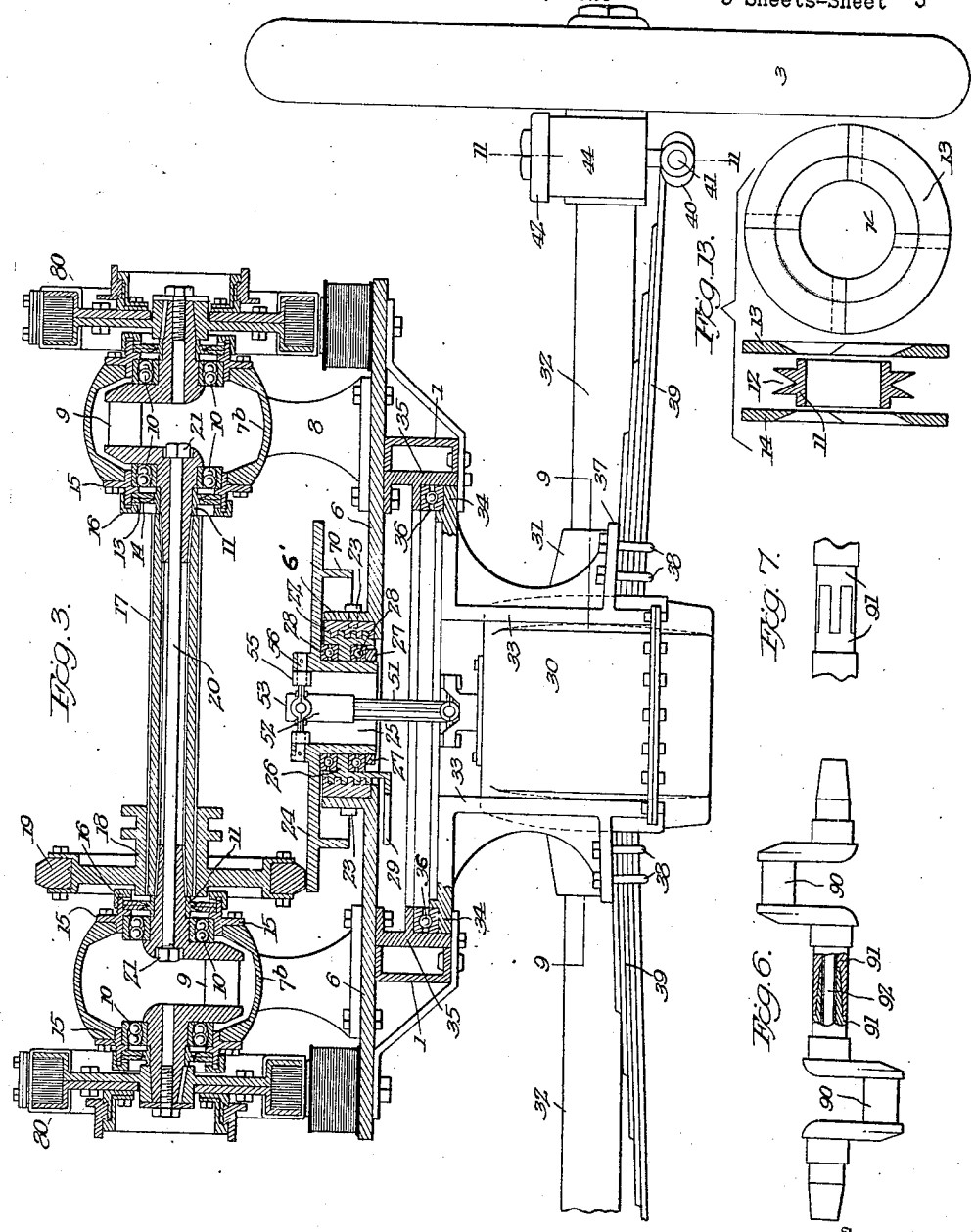
July 10, 1928.
H. H. SCHIELER
MOTOR VEHICLE
Filed Nov. 15, 1923
5 Sheets-Sheet 3
1,676,357
Inventor
Harry H. Schieler
Attorneys July 10, 1928.

H. H. SCHIELER 1,676,357

MOTOR VEHICLE

Filed Nov. 15, 1923

Inventor

Harry H. Schieler

Attorney

July 10, 1928.
H. H. SCHIELER
MOTOR VEHICLE
Filed Nov. 15, 1923
1,676,357
5 Sheets-Sheet 5
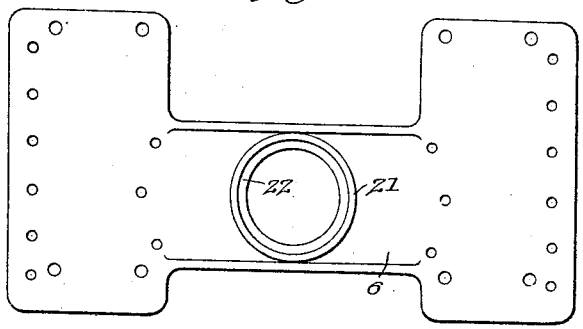
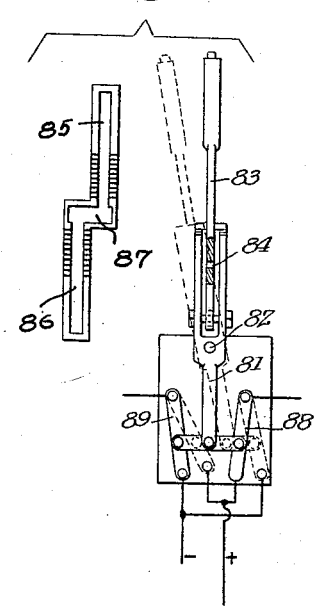
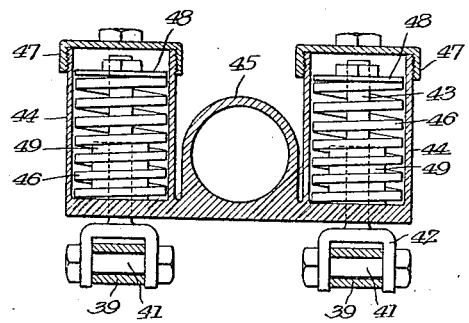
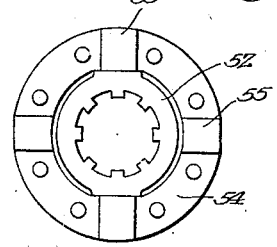
Inventor
Harry H. Schieler
By Cushman, Bryant & Darby
Attorneys Patented July 10, 1928.

1,676,357

UNITED STATES PATENT OFFICE.

HARRY H. SCHIELER, OF NEW MEADOWS, IDAHO, ASSIGNOR OF ONE-THIRD TO CHARLES E. STOLTZ, OF WEBSTER GROVES, MISSOURI.

MOTOR VEHICLE.

Application filed November 15, 1923. Serial No. 674,957.

The present invention relates to improvements in motor vehicles, and particularly to machines of the type or class in which the power of a suitable engine or motor is transmitted to the driving wheel by means of friction drive devices instead of intermeshing gear trains.

More particularly the embodiment of the invention hereinafter described, and illustrated in the accompanying drawings, is a machine in which all of the power and driving devices are located at the front of the supporting frame, the forward wheels being both driving and steering wheels.

Among the objects of the invention may be mentioned the providing of a motor vehicle, in which all of the driving mechanism is located above the forward axle and the use with such a mechanism of a two-cycle, reversible, free running, explosive engine as the primary motive power.

Another object of the invention is to provide a connection between the driving elements and the vehicle frame, which shall have a maximum amount of flexibility and in which the weight will be supported as close to the ground wheels as is possible.

Other objects will appear from the following description.

It will be understood that in the accompanying drawings many of the parts are shown more or less conventionally and diagrammatically, and that unless specifically referred to therein the appended claims are not intended to be limited to the exact details illustrated. That is, there can, of course, be considerable modification as to detail without departing from the spirit of the invention or the scope of many of the claims, the drawings being intended to be illustrative rather than restrictive of the invention.

In the accompanying drawings:—

Fig. 1 is a plan of a motor vehicle embodying the present invention.

Fig. 2 is a side elevation.

Fig. 3 is a vertical sectional view substantially on the line 3—3 of Figure 1, on an enlarged scale.

Fig. 4 is a section substantially on the line 4—4 of Figure 1.

Fig. 5 is a side elevation of one of the motor generators.

Fig. 6 is a detail of a slightly modified form of engine crank shaft from that shown in Fig. 3.

Fig. 7 is an elevation of the meeting ends of the sections of the crank shaft shown in Figure 6.

Fig. 8 is a detached plan of the base plate by which the power devices are supported on the vehicle frame.

Fig. 11 is a detail section substantially on the line 11—11 of Figure 3.

Fig. 12 is a detail of the connection between the driven disk of the friction gear and the shaft that transmits power to the driving axle.

Fig. 13 illustrates details of the packing employed for maintaining compression in the crank case of the propelling engine.

Fig. 14 illustrates the adjusting lever and switch devices controlling the motor generators.

Figure 9:
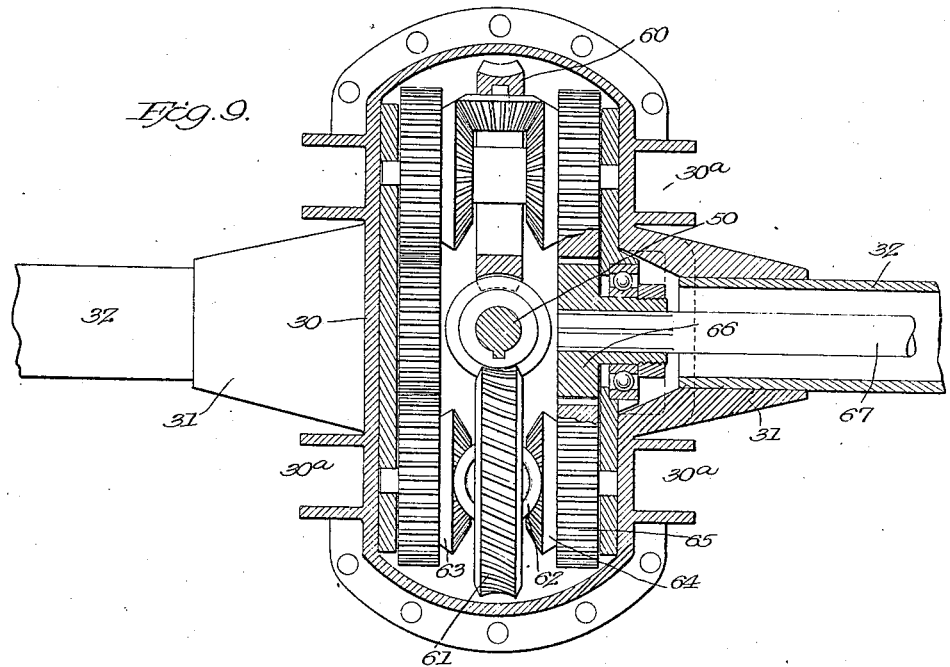
Fig. 9 is a plan of parts of the driving axle and the actuating means therefor, being substantially a section on the line 9—9 of Figure 3.
Figure 10:
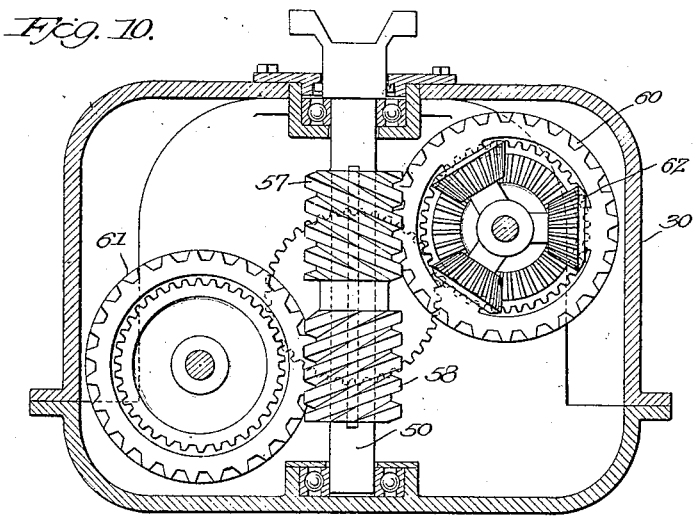
Fig. 10 is a vertical section through parts shown in Fig. 9.

Referring to the drawings in the several figures, of which like reference characters designate corresponding parts, the improved vehicle includes a main frame 1, which is provided with rear ground wheels 2, and front wheels 3. The wheels 2 are mounted at the ends of a suitable axle 4 and the rear end of the frame 1 is represented as supported from said axle by leaf springs 5 that extend longitudinally of the frame.

As previously described, it is proposed to utilize the front wheels 3 for both driving and guiding the vehicle, and said wheels are suitably connected to the outer ends of the sections of a live axle surrounded by a tubular axle casing that will be hereinafter more particularly referred to.

A main supporting plate or base 6 is suitably secured to the side members of the frame 1 at the forward end thereof, and to said base plate is secured the engine or prime mover employed for propelling the vehicle. As shown, two explosive engines 7 are provided, each being of the two-cycle type. Each engine is mounted on a suitable pedestal 8, which is bolted to the base plate 6 and the exhaust opening 7$^a$ from the explosion chamber of the engine opens into this pedestal. The crank case 7$^b$ of the engine is closed at the end by a removable head or plate 7$^c$, in which is provided an inlet with which communicates a pipe $7^d$ for the supply of hydrocarbon fuel. The throttle valve of the engine is conventionally illustrated at $7^e$.

In the crank case of each engine is arranged a crank 9, the shaft arms of which extend through apertures in the side walls of the crank case and are supported by suitable ball bearings 10.

It will be appreciated that it is very important to maintain a relatively high state of compression in the crank case of the engine cylinder, and, therefore, means are provided, whereby any escape of pressure from the crank case about or through the ball bearing supports for the crank will be prevented.

Preferably a packing collar 11 is fitted about each shaft arm of the crank 9 outside of the crank case, said ring being between and abutting a shoulder on the crank and a coupling sleeve, hereinafter described, which connects the two cranks. The ring 11 is provided with a peripheral V-shaped groove 12, and into said groove are fitted the bevelled edges of two disks 13, 14, that are seated in a recess formed in a plate 15 bolted to the engine crank case and provided with an inner recess which receives one of the seats or bearing members of the anti-friction bearing 10, before referred to. The recess receiving the rings 13, 14, is formed in an exteriorly threaded annular projection from the face of the closure plate 15; and a ring nut 16 is provided for holding said disks 13, 14, in close engagement with the face of the plate 15. As a further means of preventing any possibility of leakage past the rings 13, 14, each of these is preferably made in two sections with overlapping bevelled edges, and the two are so related that the joint between the sections of one of said rings is out of alignment with the corresponding joint between the sections of the other ring.

The inwardly extending arms of the cranks 9 are connected by a sleeve 17, which is provided with a series of exterior ribs or splines, and on said sleeve is fitted the hub 18 of the friction driving wheel 19.

The arm portions of the cranks are made tubular and the end sections thereof are tapered and exteriorly splined, such splined tapered portions being received in correspondingly shaped sockets at the ends of the sleeve 17. A tie rod 20 extends through the sleeve and aligned passages formed in the crank arms and to the ends of said rod are secured nuts 21 seated in recesses in the crank arms and held firmly in position by suitable cotter pins or keys.

This connection it will be seen forms a very strong crank shaft construction, and yet by removing the end cover plate $7^c$ of either engine crank case the parts of the crank shaft can be readily disconnected.

The opening closed by the plate $7^c$ also, of course, provides means for readily obtaining access to the connection of the engine piston with the crank 9.

The base plate 6 is provided with a centrally arranged, upwardly projecting, recessed boss $6^1$. Within such boss is fitted a nut 22 having an internal thread formed therein. Rotation of the nut 22 within the boss $6^1$ is prevented by screws 23.

The driven disk 24 of the friction drive devices is provided with a depending hub 25, which extends through the nut 22 and is connected to an exteriorly threaded sleeve 26, the thread of which corresponds to and engages with the internal thread of the nut 22.

As shown, the sleeve 26 is connected with the depending hub 25 of the disk 24 by a split lock nut 27 screwed on the lower threaded end of the hub, ball bearings 28 being shown as arranged between the hub and sleeve. At its lower end the sleeve 26 is provided with an arm 29 that is in turn connected to a suitable control lever, by means of which the sleeve may be oscillated and thereby the friction driven disk 24 moved bodily toward and from a position of engagement with the friction drive wheel 19.

The speed at which the disk 24 rotates is varied by sliding the friction driving wheel 19 longitudinally of the sleeve section 17 of the engine crank shaft, and it will be seen that the parts are so positioned that the speed of the disk 24 will be increased as the wheel 19 is moved toward the axis thereof. Any suitable control lever, not shown, may be employed for sliding the wheel 19 as above referred to.

The base plate 6 constitutes the upper member of the fifth wheel connection between the frame and front axle of the vehicle by which steering movements are effected.

The lower member of the fifth wheel connection comprises a gear casing 30 having laterally projecting bosses 31, in which are fitted the sections 32 of the tubular casing of the front axle.

On the outer face of each of the side walls of the gear casing 30 are formed two vertical channels, $30^a$, situated, respectively, in front and in rear of the laterally projecting axle bearings or bosses 31 and into such grooves extend arms 33 that depend from the lower fifth wheel member 34. This is supported from the upper member 6 by suitable brackets 35, antifriction bearings 36 being provided between the members.

Each arm 33 is provided with a lateral projection 37, to which is secured as by clips 38, the inner end of a leaf spring 39. The outer end of the spring 39 is bent to form a loop 40 and through said loop extends a bolt 41, which also passes through the arms 42 of a spring hanger 43. This hanger extends upward into a cylindrical casing 44, which is supported by a saddle member 45 surrounding the front axle section 32. It will be seen that there are two springs 39, one in advance and one in rear of each axle section 32, and the manner of connecting the spring to the gear case 30 and the axle section 32 is duplicated.

Within the casing 44 is arranged a heavy coil spring 46 and the outer end of the case is closed by a screw cap 47. About the upper end of the hanger 43 is secured a plate 48, which bears upon the spring 46, and to prevent undue compression of said spring and limit the downward movement of the hanger 43, the casing 44 is provided with an upwardly extending tubular post 49, which surrounds the hanger stem, and with which the plate 48 will contact when the desired maximum amount of pressure has been applied to the spring.

The gearing for driving the front wheels 3 is arranged within the casing 30 which is supported by the springs 39 as before described.

A worm shaft 50 is mounted in suitable ball bearings at the top and bottom of the casing 30 and at its upper end is connected by a universal joint with a shaft 51 that extends upward and into a sleeve 52. The sleeve 52 is provided near its upper end with diametrically opposite trunnions, that are mounted in bearings 53 on a ring member 54. The member 54 is provided at diametrically opposite points intermediate the bearings 53 with bearings 55, which are fitted over studs 56 that are secured to lugs, or an upwardly extending flange, on the friction disk 24.

The sleeve 52 is, therefore, connected with the friction disk 24 by a universal joint and said sleeve is interiorly provided with a plurality of longitudinally extending grooves and ribs which engage corresponding splines on the shaft 51, so that there may be free relative vertical movement between the friction disk and the gearing for actuating the wheels 3.

On the shaft 50, within the casing 30, are splined two oppositely directed worms 57, 58, which are integral one with the other and, respectively, mesh with worm wheels 60, 61. On each spoke of the worm wheels 60, 61, is mounted a bevelled pinion 62, which meshes with pinions 63, 64, that are mounted on shafts supported in suitable bearings within the casing 30. A pinion 65 is arranged to turn with each bevelled pinion 64 and the pinions 65 at each side of the casing both mesh with a pinion 66 secured on the inner end of the wheel driving shaft 67 that extends through the axle casing 32.

The construction is such that a differential gearing is provided in the casing 30, and the power of the friction disk 24 is transmitted thereto through the shaft 51 extending coaxial with the fifth wheel connection between the forward axle and the frame of the vehicle.

It will be seen that the worm gear assembly which is forward of the axle 32 is above the center of the gearing in the casing 30, and this particular arrangement acts to force both worm assemblies toward the worm shaft.

The speed of the vehicle is controlled by service and emergency brakes (not shown) cooperating with the rear wheels in the ordinary manner and by a brake drum 70 on the friction disk 24. Primarily this last brake serves to control the front wheels without interfering with free and unrestricted steering action while said brake is in operation.

This method of control is of great importance in vehicles embodying the type of front wheel drive herein described and in which runners, for travelling on snow, are substituted for the rear wheels.

To the other ends of the engine crank shaft are connected the rotary members of two electric motor generators 80. The stationary members of these motor generators are mounted on the base plate 6, which forms the magnetic yoke for said generators, as well as the foundation member or support for the engine 7 and the upper element of the fifth wheel connection between the vehicle frame and the front axle construction.

The motor frame generators are illustrated conventionally only, no attempt having been made to illustrate some of the features, for example, the commutator and brushes, thereof. Said generators are to be connected in series when a suitable starting switch, not shown, is moved to operative position, and may be connected either in series or multiple, as desired, when the starter switch is opened.

A combination spark control lever and reversing switch, illustrated in Figure 14, provides the means for reversing the starting motors.

Said switch comprises a lever 81 fulcrumed at 82 on a suitable panel board and having its upper end forked or of U-shape. Within the fork of the lever 81 is fulcrumed a lever 83 having therein an aperture 84 to receive a connection from the timer of the electric system. The lever 81 is adapted to be moved in a slotted member comprising two unaligned sections 85, 86, connected at their adjacent ends by a transverse portion 87. The lever 81 is connected by a cross bar with pivotally mounted switch points 88, 89 adapted to cooperate with suitable positive and negative terminals, as conventionally illustrated. The leads at the bottom of the switch are connected respectively with the ground and the battery of the electric system, while the upper leads from a metallic circuit including the motor generators and the starter switch, before referred to, may be wired in series with either one of these leads.

By manipulating the lever 81, the direction of rotation of the rotary member of the electric motor generators may be reversed, as desired.

It will be noted that the rotary members of the motor generators constitute fly wheels for the explosive engines, and that this element, therefore, serves the function of a starter to crank the engines and as a fly wheel to balance the revolutions of the engines and insure quiet running thereof.

In the embodiment of the invention specifically described, it is assumed that the engine crank shaft has but two cranks. It will be evident, however, that many of the features of the invention could be embodied in a machine in which a crank shaft having a larger numer of cranks was employed and with such a construction it might possibly be preferable to employ a modified construction of shaft such as illustrated in Figure 6.

Referring to this figure it will be seen that the shaft comprises a plurality of sections, each including a crank 90, provided with aligned oppositely directly tubular shaft members 91. The meeting ends of adjacent cranks are tapered and socketed to overlap in close fitting relation and said sections are connected by a rod 92 extending through the shaft portions and firmly held against longitudinal movement relative to the cranks. The engaging ends of adjacent crank sections may be provided with interlocking tongues as shown.

It will be understood that the vehicle is to be provided with any suitable means for turning the forward wheels about the vertical axis for steering the vehicle, and it is preferred to arrange the steering devices 100 at the right hand side of the vehicle body. The vehicle illustrated also is provided with a single headlight 101 mounted on the top thereof. The headlight 101 is intended to be a self centering swivel light having a handle within reach of the driver so that the beam of light therefrom may be directed in any desired direction and on releasing the handle the headlight will be automatically returned to its normal position.

It is believed that the operation of the several parts hereinbefore described, and the advantages incident to the arrangement illustrated and described, will be readily understood and appreciated from the foregoing description.

An important feature of the invention is that all of the motive power elements are mounted on a single base plate or foundation, 6, so that they can be positioned on the frame as a unit after having been completely assembled and tested.

All of the power mechanism is supported above the front axle and the arrangement of parts described avoids entirely the necessity for the complicated transmission gearing and the use of valves, gears, oil pumps, etc., which are necessary where internal combustion engine of the "four-cycle" type are employed.

The important advantages of the combination described are that a very flexible connetcion is provided between the driving elements and the vehicle frame and the weight of the power parts is suspended as close as possible to the road contacting element. The particular form of friction drive is also considered a decided improvement over the arrangement heretofore proposed.

Having thus described the invention, what is claimed as new is:

1. A motor vehicle having in combination a frame, ground wheels, a plate on the frame adjacent the forward ground wheels and having an opening therethrough, two engines mounted on said plate at opposite sides of the opening therein, a sleeve connecting the crank shafts of the engines, a friction wheel mounted on and adjustable longitudinally of said sleeve, a friction disc positioned above said plate and having a hub portion extending through the plate opening, differential drive gearing supported by the frame below said plate and connected to the forward ground wheels, and a shaft extending through the opening in the engine plate and connecting said disc and differential gearing.

2. A motor vehicle having in combination a frame, ground wheels, a plate supported on the frame near the forward end thereof and having an opening formed therethrough, two engines mounted on said plate at opposite sides of said opening, a sleeve connecting the crank shafts of the engines, a friction wheel mounted on said sleeve and adjustable longitudinally thereof, a friction disc contacting with said friction wheel and having a hub extending through the opening in said plate, a shaft connected to and depending from said hub, connections between the forward ground wheels and the frame permitting these wheels to turn about an axis concentric with said shaft, and means connecting the ground wheels with said shaft including a differential gearing.

3. A motor vehicle having in combination a frame, ground wheels, a plate on the frame adjacent the forward ground wheels and having an opening therethrough, two engines mounted on said plate at opposite sides of the opening therein, a sleeve connecting the crank shafts of the engines, a tie-rod extending through said sleeve and secured to each engine crank shaft, a friction wheel mounted on and adjustable longitudinally of said sleeve, a friction disc positioned above said plate having a hub portion extending through the plate opening, a differential drive gearing supported by the frame below said plate and connected to the forward ground wheels, and a shaft extending through the opening in the engine plate and connecting said disc and differential gearing.

4. A motor vehicle having in combination a frame, ground wheels, a plate supported on the frame near the forward end thereof, and having an opening formed therethrough, two engines mounted on said plate at opposite sides of the opening therein, the sleeve connecting the crank shafts of the engines, electric motor generators mounted on said plate and connected to the outer ends of the engine crank shafts, a friction wheel mounted on and adjustable longitudinally of said sleeve, a friction disc positioned above said plate and having a hub portion extending through the plate opening, differential drive gearing supported by the frame below said plate and connected to the forward ground wheels, and a shaft extending through the opening in the engine plate and connecting said disc and differential gearing.

5. A motor vehicle having in combination, a frame, ground wheels, a plate on the frame adjacent the forward ground wheels and having an opening therethrough, two engines mounted on said plate at opposite sides of the opening therein, a sleeve connecting the crank shafts of the engines, a friction wheel mounted on and adjustable longitudinally of said sleeve, electric motor generators mounted on said plate, each having a stationary and a rotating element, said rotating elements of the motor generators being connected to the outer ends of the engine crank shafts and forming fly wheels for the explosive engines, a friction disc positioned above said plate and having a hub portion extending through the plate opening, differential drive gearing supported by the frame below said plate and connected to the forward ground wheels, and a shaft extending through the opening in the engine plate and connecting said disc and differential gearing.

6. In a motor vehicle, the combination of a frame, ground wheels, an engine on the frame, a friction disc having a hub projecting from one face, an internally threaded bearing on the frame receiving said hub, connections between said disk and two of the wheels, a friction wheel on the frame adapted to contact with said disk and connected to the engine, and a manually rotatable sleeve surrounding the hub of the friction disk and connected with said hub by means preventing relative axial movement between the hub and sleeve while permitting relative rotary movement between said parts, said sleeve having an exterior thread engaging the internal thread of the bearing on the frame, whereby the disk may be moved axially toward and from the friction wheel.

7. In a motor vehicle, the combination of a frame, ground wheels, an engine on the frame, a friction disk having a hub projecting from one face, an internally threaded bearing on the frame receiving said hub, connections between said disk and two of the wheels, a friction wheel on the frame adapted to contact with said disk and connected to the engine, a sleeve surrounding the hub of the friction disk and having an exterior thread engaging the thread in the bearing on the frame and an inwardly projecting rib, an anti-friction bearing between said rib and the disk, a collar on the disk hub beyond said rib on the surrounding sleeve, an anti-friction bearing between said rib and collar, and means for turning the sleeve to move the disk to and from engagement with the friction wheel.

8. In a motor vehicle, the combination of a frame, ground wheels, a base plate mounted on the frame, two two-cycle explosive engines mounted on the base plate adjacent the sides thereof, two electro motor generators on the base plate adjacent said engines, the rotary element of each generator being connected with the outer end of the crank of the adjacent engine, a shaft connecting the inner ends of the engine cranks, a driven disk supported by the base plate, means for transmitting power from said disk to ground wheels of the vehicle, and a friction drive wheel on said shaft engaging the driven disk, all of the parts mounted on the base plate being removable therewith as a unit and the direction of rotation of the engine cranks the rotary elements of the motor generators, and the friction drive wheel and the momentum thereof being the same as that of the vehicle ground wheels.

9. In a motor vehicle, the combination of a frame, ground wheels, a pair of front wheels being adapted to be bodily adjusted about a vertical axis to guide the vehicle, a power actuated friction wheel supported on the frame, a friction disk connected by gearing to the front ground wheels to drive the same, a brake drum depending from said disc and arranged concentric with the axis about which the front wheels are adjusted to steer the vehicle, and means rotatable about the aforesaid verical axis for moving said friction disk to and from a position where it will contact with the friction wheel.

10. In a motor vehicle, the combination of a frame, ground wheels, a pair of front wheels being adapted to be bodily adjusted about a vertical axis to guide the vehicle, a power actuated friction wheel supported on the frame, a friction disk supported on the frame and having a depending hub arranged concentric with said vertical axis, power transmitting means connecting said disk with the front ground wheels, a brake drum depending from the disk and surrounding said hub, and manually movable threaded adjusting means cooperating with the disk between the hub and brake drum and adapted to positively move said disk in either direction vertically into and from contact with the said friction wheel.

11. In a motor vehicle, the combination of a frame, ground wheels, the front wheels being supported from the frame to be bodily adjusted about a vertical axis that intersects the horizontal axis of the ground wheel to guide the vehicle, an engine on the frame, a friction disk supported on the frame to rotate about the said steering axis, gearing for driving the front wheels including a shaft arranged concentric with the steering axis and telescopically engaging a member on the friction disk, a friction wheel connected with the engine and bearing on one face of the friction disk, means for adjusting the friction wheel to and from the axis of the friction disk, and manually controlled means for moving the friction disk toward and from contact with the friction wheel.

12. In a motor vehicle, the combination of a frame, ground wheels, the front wheels being supported from the frame to be bodily adjusted about a vertical axis to guide the vehicle, an engine on the frame, a friction disk supported on the frame to rotate about the said steering axis, gearing for driving the front wheels including a shaft arranged concentric with the steering axis and telescopically engaging a member on the friction disk, a friction wheel connected with the engine and bearing on one face of the friction disk, means for adjusting the friction wheel to and from the axis of the friction disk, means for moving the friction disk toward and from contact with the friction wheel, and a brake drum projecting from the opposite face of the friction disk from that engaged by the friction wheel.

13. In a motor vehicle, the combination of a frame, ground wheels, the front wheels being supported from the frame to be bodily adjusted about a vertical axis to guide the vehicle, an engine on the frame, a friction disc supported on the frame to rotate about the said steering axis, said disc having concentric flanges, one of said flanges providing a hub portion, the other of said flanges forming a brake drum, lugs arranged on said disc, differential drive gearing for the front wheels including a shaft concentric with the steering axis, a sleeve having diametrically opposed trunnions adjacent one end, said sleeve telescopically engaging said shaft and splined thereto, a ring between said sleeve and hub members having bearings formed therein with which said trunnions are in engagement, studs engaging said lugs and bearings for maintaining the sleeve in rotative relation to the disc, a friction wheel connected with the engine and bearing on one face of the friction disc, means for adjusting the friction wheel to and from the axis of the friction disc, and means for moving the friction disc into and out of contact with the friction wheel.

14. In a motor vehicle, the combination of a frame, ground wheels, the front wheels being supported from the frame to be bodily adjusted about a vertical axis to guide the vehicle, an engine on the frame, a friction disc supported on the frame to rotate about the said steering axis, said disc having concentric flanges on its under side, one of said flanges providing a hub portion, the other of said flanges forming a brake drum, an annular flange on the top side of said disc, differential drive gearing for the front wheels including a shaft arranged concentric with the steering axis, a sleeve having diametrically opposed trunnions adjacent one end, said sleeve telescopically engaging said shaft and splined thereto, a ring between said sleeve and hub members having bearings formed therein with which said trunnions are in engagement, studs engaging said circular flange and bearings for maintaining the sleeve in rotative relation to the disc, a friction wheel connected with the engine and bearing on one face of the friction disc, means for adjusting the friction wheel to and from the axis of the friction disc, and means for moving said friction disc into and out of contact with said friction wheel.

15. In a motor vehicle, the combination of a frame, ground wheels, the front wheels being supported to turn about a vertical axis to guide the vehicle, a shaft mounted on the frame and provided with a plurality of cranks, an explosive engine connected with each crank, an electric motor generator on the frame beyond each end of the shaft, the rotating element of each motor generator being secured to the shaft, a reversing switch controlling both motor generators, and means for transmitting power from the shaft to the front wheels.

16. In a motor vehicle, the combination of a frame, ground wheels, a shaft mounted on the frame and provided with two cranks, an explosive engine connected with each crank, an electric motor generator adjacent each end of the shaft, the armatures of both motor generators being secured to the shaft and each constituting a fly wheel for one of the engines, and means for transmitting power from the shaft to two of the ground wheels.

17. In a motor vehicle, the combination of a frame, ground wheels, two explosive engines supported on the frame, a driving shaft connecting the adjacent ends of the cranks of said engines, an electric motor generator adjacent the other end of each engine crank and each including a ring type armature which is secured to the engine crank and constitutes a fly wheel therefor, and means for transmitting power from the driving shaft to two of the ground wheels.

18. In a motor vehicle, the combination of a frame, ground wheels, two two-cycle explosive engines mounted on the frame with their pistons adapted to reciprocate in substantially horizontal planes, the crank shaft of each engine being supported by ball bearings adjacent both ends, an electric motor generator positioned adjacent the outer end of each engine crank shaft and including a ring type armature connected to the crank shaft and constituting a fly wheel, a driving shaft connecting the engine crank shafts, and means for transmitting power from the driving shaft to two of the ground wheels.

19. In a motor vehicle, the combination of a frame, ground wheels including two adapted to be turned about a vertical axis to steer the vehicle, a shaft mounted on the frame and provided with two cranks, a two cycle explosive engine connected with each crank, an electric motor generator adjacent each engine, the rotary element of each motor generator being connected to the shaft and constituting a fly wheel for the adjacent engine, a reversing switch controlling both motor generators, and means for transmitting power from the shaft to the steering wheels of the vehicle.

20. In a motor vehicle, the combination of a frame, ground wheels including two adapted to be turned about a vertical axis to steer the vehicle, a base plate mounted on the frame, two explosive engines mounted on the base plate, adjacent the sides of the frame, a shaft extending transversely of the frame and having a crank connected with the piston of each engine, two electric motor generators mounted on the base plate, the rotary element of each generator being connected to the crank shaft and constituting a fly wheel for the adjacent engine, said base plate, engines and motor generators being removable as a unit from the frame, and means for transmitting power from the shaft to the steering wheels.

21. A motor vehicle having in combination a frame, ground wheels, a bed plate mounted on the frame and having an opening therethrough, two internal combustion engines mounted on said plate at opposite sides of said opening, a detachable connection extending between the crank shafts of said engines, in a direction substantially parallel with the length of the vehicle axles, a friction drive wheel mounted on said crank shaft connection, a friction disk supported on said bed plate, means for effecting relative movement of said friction wheel and disk to establish contact between them, and means for transmitting power from the friction disk to two of the ground wheels.

22. A motor vehicle having in combination a frame, ground wheels, a bed plate mounted on the frame and having an opening therethrough, two internal combustion engines mounted on said plate at opposite sides of said opening, a detachable connection extending between the crank shafts of said engines, in a direction substantially parallel with the length of the vehicle axles, a friction drive wheel mounted on said crank shaft connection, a friction disk supported on an anti-friction bearing on said plate to turn about a vertical axis and having a hub extending through the opening in the plate, said plate, engines, friction wheel and disk being movable as a unitary structure relative to the vehicle frame, means for effecting relative movement of the friction wheel and disk to establish contact between them, and means for transmitting power from the friction disk to two of the ground wheels.

23. A motor vehicle having in combination a frame, ground wheels, a bed plate mounted on the frame and having an opening therethrough, two two-cycle internal combustion engines mounted on said plate at opposite sides of said opening, a detachable connection extending between the crank shafts of said engines in a direction substantially parallel with the length of the vehicle axles, a friction drive wheel mounted on said crank shaft connection, a friction disk supported on said bed plate to turn about a vertical axis, said plate, engines, friction wheel and disk being movable as a unitary structure on the vehicle frame, means for effecting relative movement of the friction wheel and disk to establish contact between them, and means for transmitting power from the friction disk to two of the ground wheels.

24. A motor vehicle having in combination a frame, ground wheels, two internal combustion engines mounted on the frame with their crank shafts in alignment, ball bearings supporting both ends of the crank shaft of each engine, a detachable connection between the crank shafts of the engines, and gearing for transmitting power from said connection to two of the ground wheels.

25. A motor vehicle having in combination a frame, ground wheels, two internal combustion engines mounted on the frame with their crank shafts in alignment, ball bearings supporting both ends of the crank shaft of each engine, a sleeve having its ends engaged with the adjacent ends of both engine crank shafts, a tie rod extending through said sleeve and connected to both crank shafts and gearing for transmitting power from said connected crank shafts to two of the ground wheels.

26. In a motor vehicle, the combination of a frame, ground wheels, two two-cycle explosive engines on the frame with their crank shafts in alignment, ball bearings supporting both ends of the crank shaft of each engine, means closing the apertures in the side walls of each engine crank case outside of the ball bearings to maintain compression pressure in the crank cases, a shaft connecting the inner ends of the engine crank shafts, a friction drive wheel on said connecting shaft, a driven disk supported by the frame and engaged by said drive wheel, and means for transmitting power from said disk to two of the ground wheels.

27. In a motor vehicle, the combination of a frame, ground wheels, two two-cycle explosive engines on the frame with their crank shafts in alignment, ball bearings supporting both ends of the crank shaft of each engine, a collar on each end member of each engine crank shaft, outside the supporting ball bearings, stationary sectional packing rings extending into grooves formed in said collars and the surrounding external portions of the engine casing, to maintain compression pressure in the engine crank cases, a shaft connecting the inner ends of the engine, a driven disk supported by the frame and engaged by said drive wheel, and means for transmitting power from said disk to two of the ground wheels.

In testimony whereof I have hereunto set my hand.

HARRY H. SCHIELER.